E. TARRANT.

Machines for Turning Logs.

No. 5,487. Reissued July 15, 1873.

Witnesses.
Alexander Rodgers
Martin Perley

Inventor.
Esau Tarrant

N. PETERS, Photo-Lithographer, Washington, D. C.

UNITED STATES PATENT OFFICE.

ESAU TARRANT, OF MUSKEGON, MICHIGAN, ASSIGNOR TO ALEXANDER RODGERS, OF SAME PLACE.

IMPROVEMENT IN MACHINES FOR TURNING LOGS.

Specification forming part of Letters Patent No. 81,432, dated August 25, 1868; reissue No. 5,487, dated July 15, 1873; application filed June 25, 1873.

*To all whom it may concern:*

Be it known that I, ESAU TARRANT, of Muskegon, in the county of Muskegon and State of Michigan, have invented a new and Improved Machine for Turning Logs; and I do hereby declare that the following is a full, clear, and exact description thereof, which will enable others skilled in the art to which it appertains to make and use the same, reference being had to the accompanying drawings forming part of this specification.

Figure 2:
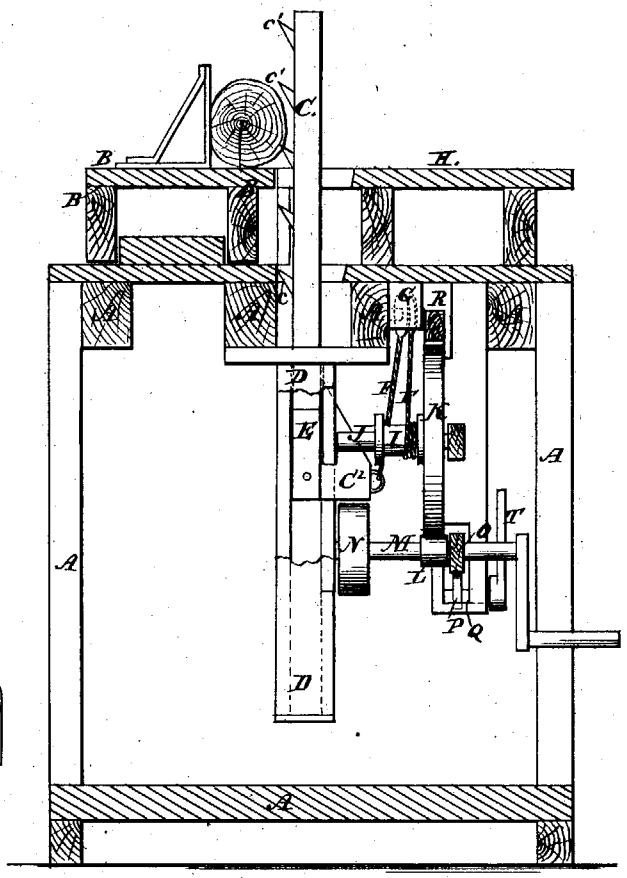
Figure 1:
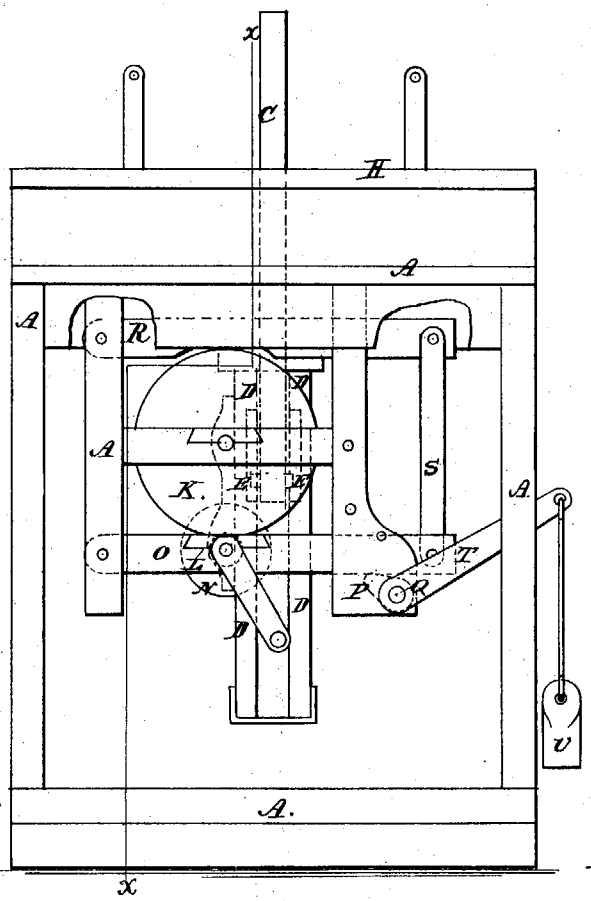

Figure 1 is a side view of my improved machine, parts of the frame being broken away to show the construction. Fig. 2 is a detail sectional view of the same taken through the line *x x* of Fig. 1.

Similar letters of reference indicate corresponding parts in the different figures of the drawing.

My invention has for its object to furnish an improved device for turning or rolling logs to or upon the carriage of circular or other saw mills which shall be simple in construction, effective in operation, and conveniently operated; and it consists in the application for that purpose of a toothed bar connected with means for giving it the necessary movement; and, further, in the construction and combination of the various parts, as hereinafter more fully described.

A represents the frame-work, and B the log-carriage, of a saw-mill. C is a bar having teeth $c^1$ attached to its forward side, and which has a vertical as well as horizontal movement, controlled by suitable guides. The lower end of the toothed arm C is pivoted to and between two blocks, E, which move up and down in grooves in the inner sides of the posts D, as shown in Fig. 2, and in dotted lines in Fig. 1. This construction enables the upper end of the bar C to move back and forth to adjust itself to the size of the log to be rolled or turned upon the carriage B, and also to enable the teeth $c^1$ to pass the log when the bar is descending. To the rear side of the lower end of the bar C is attached, or upon it is formed, a block, arm, or projection, $c^2$, to which is attached the end of the rope or chain F, by means of which the said bar C is raised to turn the log. This manner of attaching the hoisting-chain forces the upper end of the said bar C forward, causing the teeth $c^1$ to take a firm hold upon the log to be rolled. The chain or rope F passes over a pulley, G, secured in a proper position beneath a log-deck, H, and thence down to the barrel or drum I upon the shaft J, to which one end of it is securely attached. Upon the shaft J is also attached the large friction-pulley K, to which motion is given by the small friction-pulley L secured upon the shaft M, to which shaft is also attached the pulley N, by means of which motion is communicated to the apparatus from the driving-power of the mill. One end of the shaft M works in stationary bearings attached to or connected with the frame of the mill, and its other end works in bearings secured upon the bridge-tree O, one end of which is pivoted to the frame A, and the other rests upon the cam P of the cam-chaft Q, so that by means of said cam-shaft the bridge-tree O may be raised or lowered to bring the friction-pulley L into or remove it from contact with the friction-pulley K. R is a brake-bar, which may be made of wood or other suitable material. One end of this brake-bar is pivoted to the frame A or some other suitable support, and its other end is connected with one end of the bridge-tree O by the bar S, so that as the friction-pulley L is moved away from the pulley K the brake may be applied to the friction-pulley K either to hold the bar C stationary or to allow it to descend with any desired rapidity. To one end of the cam-shaft Q is attached a lever or arm, T, having a weight, U, suspended from its end, which may be regulated so as to hold the friction-pulley L against the pulley K with any desired force.

The lever or arm T may be operated to throw the friction-pulley L into or out of gear with the friction-pulley K by means of levers or cords, as may be desired or found most convenient.

Having thus described my invention, I claim as new and desire to secure by Letters Patent—

1. The toothed bar herein described, operating substantially in the manner and for the purpose specified.

2. The toothed bar C, pivoted at its lower end between the blocks E, which are adapted to slide in vertical grooves formed in the posts D, whereby the said bar C is rendered vertically movable and capable of adjustment to suit logs of different sizes, substantially as herein set forth.

3. The combination of the pivoted brake R, connection S, and pivoted bridge-tree O, substantially as herein shown and described.

4. The combination, with the bar C, of the cord or chain F, pulley G, shaft J, drum I, friction-pulleys K L, and adjustable shaft M, substantially as set forth.

5. The combination of the cam P and shaft Q and weighted arm T with the connected brake and bridge-tree, to operate as and for the purpose described.

In testimony that I claim the foregoing I have hereunto set my hand this 19th day of May, 1873.

ESAU TARRANT.

Witnesses:
JOHN J. O'LEARY,
MARTIN PERLEY.